Dec. 26, 1933.  E. E. WICKERSHAM  1,941,143
HARVESTER
Filed Feb. 10, 1930  3 Sheets-Sheet 2
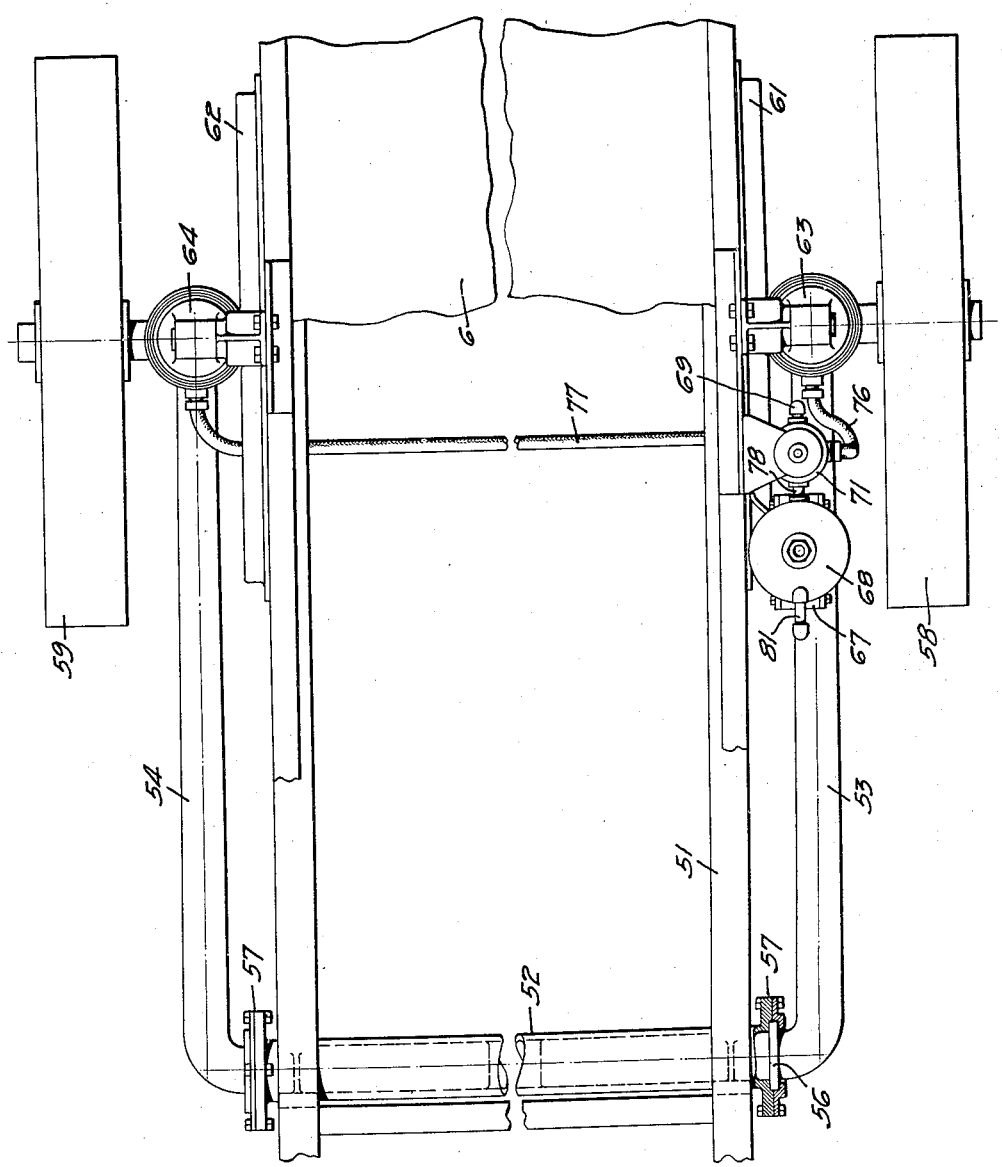
INVENTOR.
Elmer E. Wickersham
BY White, Prost, Flehr & Lothrop.
ATTORNEYS.

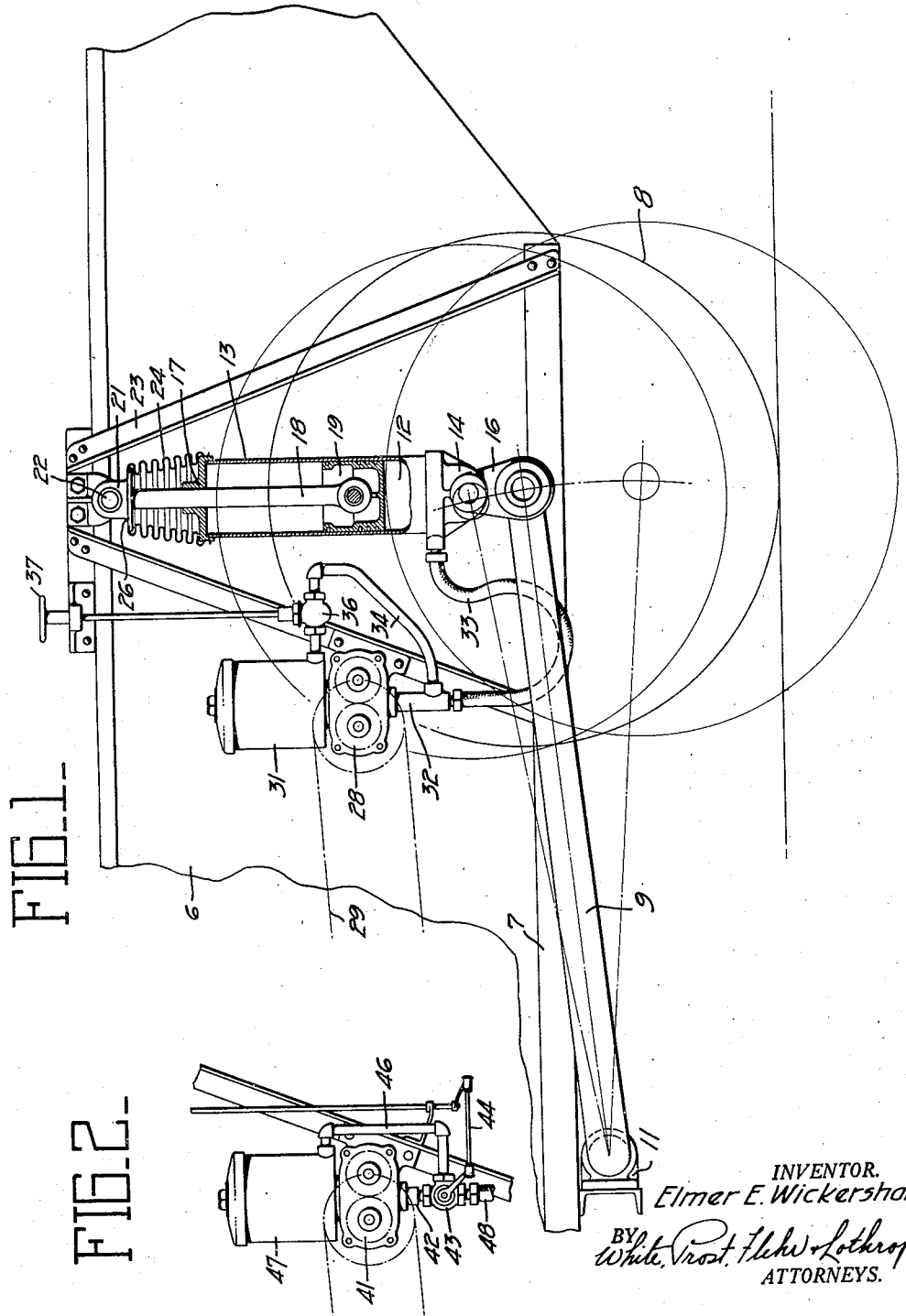

Dec. 26, 1933. E. E. WICKERSHAM 1,941,143
HARVESTER
Filed Feb. 10, 1930  3 Sheets-Sheet 3

INVENTOR.
Elmer E. Wickersham
BY White, Frost, Flehr & Lothrop
ATTORNEYS.

Patented Dec. 26, 1933

1,941,143

UNITED STATES PATENT OFFICE 1,941,143

HARVESTER

Elmer E. Wickersham, San Leandro, Calif., assignor to Caterpillar Tractor Co., San Leandro, Calif., a corporation of California Application February 10, 1930. Serial No. 427,176

16 Claims. (Cl. 56—209)

My invention relates to harvesting machinery and particularly to combined harvesters adapted to operate over hilly or uneven territory.

It is customary in the manufacture of harvesters of the combined type to manufacture two separate and distinct kinds, namely, level land harvesters and side hill harvesters. The level land harvesters are practical only on land which is virtually level. Since it is desirable for the mechanism in the separator unit of a combined harvester to operate in a substantially horizontal plane despite undulations of the territory over which the harvester is propelled, it is usual in side hill harvesters to provide a compensating or levelling mechanism. This mechanism ordinarily is a mechanical arrangement for varying the vertical spacing of the harvester wheel or wheels with respect to the main body thereof so that the body can be levelled even though the wheels are travelling on a hillside.

To the best of my knowledge, the mechanisms heretofore employed in side hill harvesters have been relatively cumbersome and expensive mechanical devices usually employing one or more screws and complex associated mechanism for varying the distance between the harvester body and the ground-engaging wheels. Not only are these mechanisms relatively expensive to manufacture and maintain, but their working parts are exposed to the elements and to dirt and dust thus requiring periodical cleaning and considerable care.

It is therefore an object of my invention to provide a relatively simple, inexpensive side hill mechanism for a harvester.

Another object of my invention is to provide a mechanism which can be applied readily to a level land harvester for converting it into a side hill type.

Another object of my invention is to provide a side hill mechanism which requires practically no attention and is well protected from deleterious influences.

The foregoing and other objects are attained in the embodiment of the invention shown in the drawings, in which Fig. 1 is a side elevation of the rear portion of the separator unit of a combined harvester with my side hill mechanism installed thereon, the hydraulic chamber being disclosed in cross section on a vertical plane.

Fig. 2 is a detail showing a modified form of valve arrangement for the hydraulic pump.

Fig. 3 is a plan, portions being broken away, of the rear end of a combined harvester with a modified form of side hill mechanism attached thereto.

Figure 4:
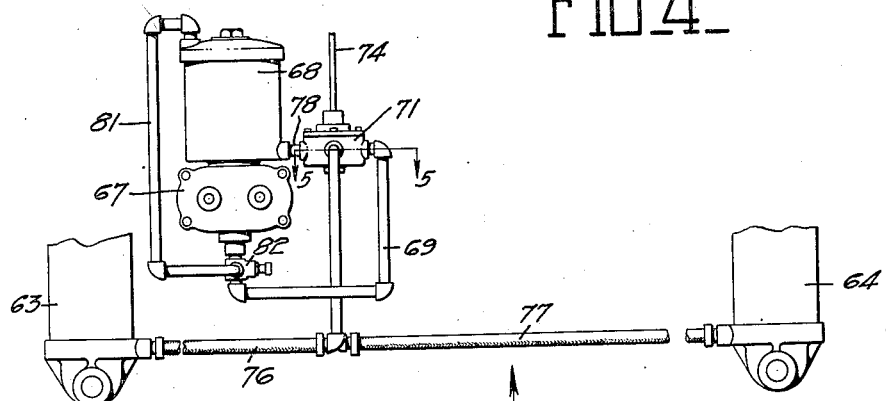
Fig. 4 is an elevation showing a form of control valve for the mechanism disclosed in Fig. 3.

In its preferred form, the harvester of my invention includes a harvester body provided with ground engaging members adapted to be variably spaced with respect to the harvester body and includes hydraulically expansible chambers interposed between the harvester body and the ground engaging members for selectively varying the spacing of the ground engaging members with respect to the harvester body.

Although I have herein alluded to the device of my invention as particularly applicable to the separator unit of a combined harvester, it is as well applicable to various other environments with beneficial results. However, the separator unit affords an installation which is typical and I shall describe my invention as it is used in connection therewith.

As shown particularly in Fig. 1, the separator unit of a combined harvester includes a body 6 mounted on a framework 7 usually made of structural shapes. Ordinarily, a ground engaging member 8 is mounted on an axle directly secured to the framework but in accordance with my invention I provide a crank axle 9, which at its rearward end, supports the wheel 8 for rotation and, at its forward end, pivots in a bracket 11 fastened to the frame 7. The ground engaging wheel is thus movable in an arc about the pivotal axis of the axle 9 and is displaceable toward and away from the frame 7. Such movement of the wheel not only varies the spacing between the wheel and the body but also in effect varies the spacing between the body and the ground.

In order to control the spacing between the body and the ground, I provide a hydraulically expansible chamber 12. The chamber is partially bounded by a cylinder 13 at its lower end having a fork 14 pivotally attached to a lug 16 secured to the crank axle 9. The cylinder 13 is covered with a cap 17 pierced to pass a rod 18 fastened to a piston 19 by which the expansible chamber 12 is also bounded. The piston rod 18 carries a boss 21 to receive a pin 22 for pivoting the piston rod at the apex of a triangular superstructure 23 constructed of suitable structural shapes and fastened to the framework 7. To form a guard for the sliding joint between the piston rod 18 and the cap 17 I preferably secure an expansible bellows-like member 24 to the cap and to an enlarged disc 26 on the piston rod. The expansion and contraction of the chamber 12 is directly in proportion to the spacing of the wheel 8 with respect to the frame or body 6 and the arcuate path of the wheel 8 is compensated for by the pivotal mountings 14 and 22, while the stresses occasioned in the transmission of the weight of the body 6 to the wheel 8 are carried by the superstructure 23.

In order to establish the volume of the expansible chamber 12 at any selected value I preferably afford a liquid or hydraulic pump 28. This pump is of any selected type and is mounted on the superstructure 23 to be driven, as by a chain 29, from any suitable source of power. Ordinarily on the separator unit of a combined harvester there are a number of sprockets driven by a sprocket chain and I preferably incorporate the drive for my pump 28 in such driving system. The pump 28 derives its operating liquid from a reservoir 31 and discharges through a duct 32. A flexible conduit 33 establishes communication between the pump 28 and the interior of the cylinder 13. Since the pump ordinarily operates continuously during the operation of the harvester machinery, I provide means for regulating the communication between the pump and the expansible chamber 12. To this end there is afforded a by-pass pipe 34 which leads from the discharge side of the pump back to the reservoir 31 through a valve 36. This valve is under the control of the harvester operator and for his convenience the valve stem is extended to terminate in an accessible hand wheel 37. When the valve 36 is closed the liquid discharged by pump 28 cannot flow through the by-pass duct 34 and back into the reservoir 31 but of necessity must pass through conduit 33 into chamber 12. The influx of liquid into the chamber forces the piston 19 upwardly with respect to the cylinder 13 and raises the body 6 with respect to the ground. In other words, the relative spacing between the body 6 and the ground engaging wheel is varied in accordance with the operation of valve 36.

When it is desired to bring the body 6 and the wheel 8 relatively closer, the by-pass valve 36 is opened fully, whereupon the weight of the body 6 forces the liquid from the chamber 12 back through the conduit 33 and into the reservoir 31. If it is desired to maintain a fixed relationship between the body 6 and the wheel 8, the valve 36, by manipulation of the hand wheel 37, can be opened the requisite amount to maintain the selected quantity of fluid within the cylinder 13.

As an optional way of controlling and conducting the oil or other liquid from the fluid pump to the expansible chamber I have afforded the arrangement shown in Fig. 2, in which the other parts are substantially as previously described but in which the fluid pump 41 discharges through a pipe 42 into a three way valve 43. This valve is controlled through a linkage 44 extending to a convenient point and governs the flow from the pipe 42, either into a return pipe 46 leading back to the fluid reservoir 47 in which instance other fluid flow is prevented, or into a conduit 48 leading to the expansible chamber 12. In one extreme position of the valve 43 all of the discharge from the pump 41 flows through the conduit 48 while in another extreme position of the valve 43 all of the pumped fluid returns through the pipe 46 to the reservoir. In intermediate positions of the valve 43 varying amounts of liquid are distributed to the conduit 48 and to the return pipe 46, and return flow from the conduit 48 to the reservoir 47 is permitted.

As shown in Fig. 3, I may install a side hill arrangement on each side of a harvester in accordance with my invention. In this instance the harvester frame 51 is provided with a cross tube 52 into which extend the terminals of crank axles 53 and 54. Preferably the axles are flanged as at 56 for confinement between collars 57 secured to the tube 52. The other extremities of the crank axles serve as mountings for ground engaging members such as the wheels 58 and 59. At each side of the framework 51 there is provided a superstructure 61 and 62 connected to which, in the manner previously described, are expansible chambers 63 and 64.

Figure 5:
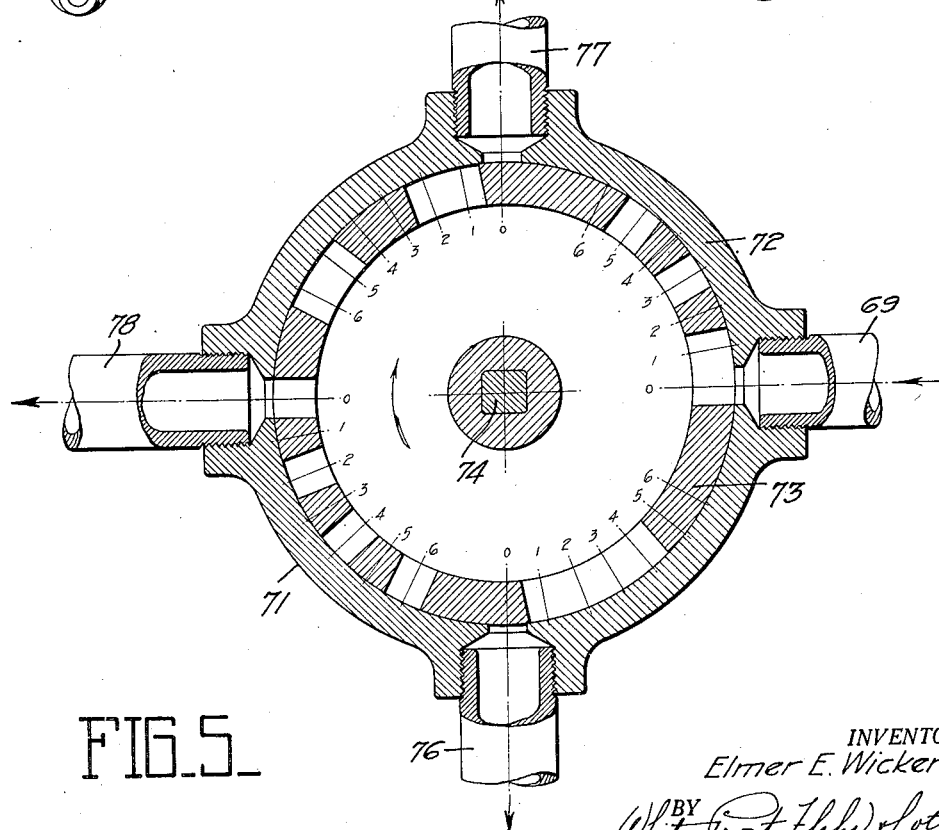
Fig. 5 is a cross section of the control valve of Fig. 4, the plane of section being indicated by line 5—5 of Fig. 4.

To supply fluid to the chambers 63 and 64 I preferably utilize an arrangement such as that particularly illustrated in Figs. 4 and 5. In this instance, there is provided a liquid pump 67 receiving liquid from a reservoir 68 and discharging through a conduit 69 into a distributing valve 71. The valve preferably includes a casing 72 having therein a ported rotor 73, controlled by a central stem 74. From the casing 72 ducts 76 and 77 lead to the chambers 63 and 64 respectively. Also extending from the casing 72 is a discharge pipe 78 returning to the reservoir 68.

The rotor 73 is adapted to be rotated to afford selectively a liquid supply to and discharge from the several expansible chambers. In the rotor position shown in Fig. 5, the liquid forced through the valve 71 by the pump 67 is returned directly to the reservoir 68 while the expansible chambers are unchanged in volume since there is no communication from them either to an inlet or to a discharge. When the rotor 73 is revolved one unit (No. 1) in a clockwise direction, as viewed in Fig. 5, the outlet pipe 78 is cut off and liquid from inlet 69 passes through both of the ducts 76 and 77 into both of the expansible chambers, thus uniformly increasing the spacing of the harvester body relative to the ground engaging wheels. The next unit of rotation (No. 2) of the rotor cuts off the influx of liquid through the passage 69 but affords communication between both of the expansible chambers 63 and 64 with the discharge pipe 78 thus permitting the weight of the harvester body to force the liquid from the chambers 63 and 64 and to lower itself with respect to the wheels. The next position (No. 3) of the rotor 73 isolates the ducts 77 and 78 and permits liquid coming from the pipe 69 to be transferred into the duct 76 thereby expanding the chamber 63. In the next position (No. 4) of the rotor, the influx of liquid is cut off and the expansible chamber 63 is afforded an opportunity to discharge through the duct 76 into the pipe 78 and thence to the reservoir 68. In the succeeding position (No. 5) of the rotor, the chamber 63 is cut off from all communication while liquid flows from the inlet 69 through the duct 77 into the chamber 64. In the final position (No. 6) the chamber 64 is permitted to discharge through the duct 77 and the valve casing 72 into the pipe 78 from whence it communicates with the reservoir 68. The spacings of each of the ground engaging members with respect to the harvester body are thus separately and collectively under the control of the operator. Any condition of undulatory terrain can be compensated for quickly and simply by suitable manipulation of the valve 71. In order to prevent an excess of pressure on the discharge side of the pump 67 from any cause, and particularly when the valve rotor 73 blocks efflux of liquid from the pump, I preferably provide a by-pass pipe 81 which leads back to the reservoir 68 and is controlled by a relief valve 82 adjustable to any desired pressure.

In both forms of my invention there is afforded a means which is simple and inexpensive for quickly and easily adjusting the body of a combined harvester to accommodate itself to undulatory country. The arrangement not only can be applied to existing level land harvesters but also is of such a nature that it can be fabricated readily and incorporated in new harvesters.

It is to be understood that I do not limit myself to the form of the harvester shown and described herein, as the invention, as set forth in the following claims may be embodied in a plurality of forms.

I claim:

1. A vehicle comprising a frame, means for mounting a ground-engaging wheel on said frame for variable spacing with respect to said frame, an expansible chamber interposed between said wheel and said frame, and means for selectively expanding said expansible chamber.

2. A vehicle comprising a frame, a superstructure on said frame, a cranked axle pivotally attached to said frame, a ground-engaging wheel rotatably mounted on said axle, an expansible chamber pivoted to said axle and to said superstructure, and means for selectively expanding said expansible chamber.

3. A vehicle comprising a frame, a superstructure on said frame, a cranked axle pivotally attached to said frame, a ground-engaging wheel journalled on said axle, an expansible chamber pivoted to said axle adjacent said wheel and pivoted to said superstructure, a pump for supplying said chamber with fluid, and means for controlling the influx of fluid to said chamber and the efflux of fluid from said chamber.

4. A vehicle having driving mechanism thereon comprising a frame, a ground-engaging wheel mounted on said frame for variable spacing with respect to said frame, an expansible chamber interposed between and connected to said wheel and said frame, a fluid supply means driven by said driving mechanism and connected to said expansible chamber, and means for controlling the influx of fluid to said expansible chamber and the efflux of fluid from said expansible chamber.

5. A vehicle comprising a frame, a cranked axle pivotally mounted on said frame, a ground-engaging wheel journalled on said axle, a superstructure on said frame, a hydraulic cylinder pivotally connected to said axle adjacent said wheel, a piston reciprocable in said cylinder and pivotally connected to said superstructure, a hydraulic pump mounted on said frame, a flexible conduit for establishing communication between said pump and said cylinder, and means for controlling hydraulic communication through said conduit.

6. A vehicle comprising a frame, a pair of cranked axles on opposite sides of said frame, ground-engaging wheels on said axles, a hydraulically expansible chamber interposed between one of said axles and said frame, a second hydraulically expansible chamber interposed between the other of said axles and said frame, and means for selectively controlling the hydraulic content of said chambers for varying the spacing of said wheels relative to said frame.

7. A vehicle comprising a frame, a pair of ground-engaging wheels mounted on said frame for variable spacing with respect thereto, hydraulically expansible chambers interposed between each of said wheels and said frame, and means for controlling individually or collectively the hydraulic content of said chambers.

8. A vehicle comprising a main frame, a ground-engaging member below said main frame, a hydraulically expansible chamber connected to said main frame and said member, and means for controlling the hydraulic content of said chamber to obtain a predetermined spacing between said member and said main frame.

9. In a vehicle, supporting wheels therefor, means to adjust said wheels with respect to said vehicle, and a single control for said means selectively operable to adjust said wheels separately or together.

10. In a vehicle, ground-engaging members therefor, means to adjust said members relative to said vehicle, and control means including a single control member operable to adjust said ground-engaging members separately or together.

11. In a vehicle, ground-engaging members therefor, means to adjust said members relative to the vehicle including fluid operable expansible chambers interposed between said members and said vehicle, and control means operable to adjust said members separately or together.

12. In a vehicle, ground-engaging members therefor, means to adjust said members relative to the vehicle including fluid operable expansible chambers interposed between said members and said vehicle, and a single control operable to adjust said members separately or together.

13. A side-hill harvester comprising a frame, means for supporting a ground-engaging member for adjustment relative to said frame, a fluid operable expansible chamber interposed between the frame and the member, and means for applying fluid to said chamber to cause relative movement between the frame and the member.

14. In a vehicle having a body, ground-engaging members therefor, means for mounting each of said ground-engaging members for adjustment relative to said body, mechanism for each ground-engaging member to effect said adjustment, and actuating means for said mechanisms including only one control member for operating said mechanisms separately or together.

15. In a vehicle having a body, a ground-engaging member at each side of the body, means for mounting each of said ground-engaging members for adjustment relative to said body, mechanism for each ground-engaging member to effect said adjustment, and actuating means for said mechanisms including a single control unit common to both of said mechanisms for operating said mechanisms separately or together.

16. In a vehicle having a body, ground-engaging members therefor, means for mounting each of said ground-engaging members for adjustment relative to said body, mechanism for each ground-engaging member to effect said adjustment, and actuating means for said mechanisms including control means therefor operable to adjust said ground-engaging members separately or together, said control means being mounted for accessibility to an operator on the vehicle.

ELMER E. WICKERSHAM.